United States Patent
Wagener

(10) Patent No.: US 6,381,122 B2
(45) Date of Patent: Apr. 30, 2002

(54) BUS BAR SYSTEM WITH SEVERAL BUS BARS AND AN INSTALLATION DEVICE WITH FLAT CONNECTORS

(75) Inventor: Hans Wagener, Dietzhölztal (DE)

(73) Assignee: Rittal Rudolf Loh GmbH & Co. KG, Herborn (DE)

( * ) Notice: Subject to any disclaimer, the term of this patent is extended or adjusted under 35 U.S.C. 154(b) by 0 days.

(21) Appl. No.: 09/761,099

(22) Filed: Jan. 16, 2001

(30) Foreign Application Priority Data

Jan. 15, 2000 (DE) .......................... 100 01 463

(51) Int. Cl.⁷ .................................................. H02B 1/04
(52) U.S. Cl. ...................... 361/611; 174/71 B; 361/650
(58) Field of Search ................................ 439/212–214, 439/527; 174/68.2, 70 B, 71 B, 72 B, 99 B, 129 B, 133 B; 200/48 R, 50 A, 50 AA, 50.01, 50.02, 168 K; 361/605, 611, 614, 624, 634, 637, 640, 648, 650

(56) References Cited

U.S. PATENT DOCUMENTS

| | | | | |
|---|---|---|---|---|
| 4,366,528 A | * | 12/1982 | Cole | 361/831 |
| 4,419,715 A | * | 12/1983 | Pear | 361/638 |
| 5,364,203 A | * | 11/1994 | Ishikawa | 403/403 |
| 5,949,641 A | * | 9/1999 | Walker et al. | 361/600 |
| 6,040,976 A | * | 3/2000 | Bruner et al. | 361/611 |
| 6,069,321 A | * | 5/2000 | Wagener et al. | 174/99 B |
| 6,111,745 A | * | 8/2000 | Wilkie, II et al. | 361/605 |
| 6,205,017 B1 | * | 3/2001 | Wilkie, II et al. | 361/605 |

* cited by examiner

Primary Examiner—Gerald Tolin
(74) Attorney, Agent, or Firm—Pauley Petersen Kinne & Erickson

(57) ABSTRACT

A bus bar system having several bus bars spaced apart from each other in a first connecting plane and of an essentially square cross section and having T-shaped connecting grooves cut into all outsides for a connection with electrical installation devices having flat connectors in a second connecting plane, which is arranged perpendicular to the first connecting plane. With specially embodied connecting and insulating elements, it is possible to displace the connecting planes of the bus bars and of the flat connectors of the installations device parallel and perpendicular with respect to each other without it being necessary to perform elaborate matching assembly work at the site.

21 Claims, 3 Drawing Sheets

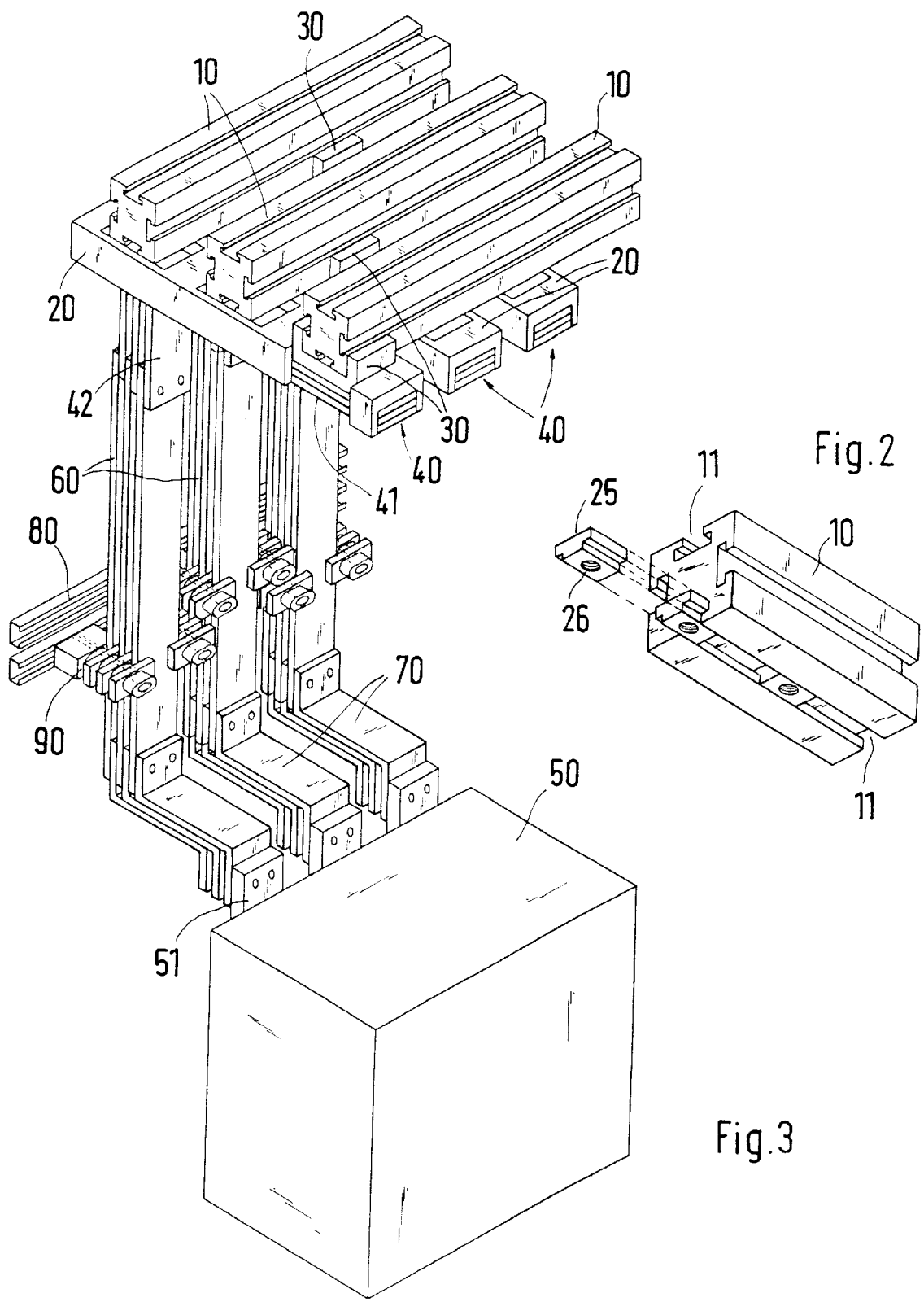

BUS BAR SYSTEM WITH SEVERAL BUS BARS AND AN INSTALLATION DEVICE WITH FLAT CONNECTORS

BACKGROUND OF THE INVENTION

1. Field of the Invention

This invention relates to a bus bar system having several bus bars, which are spaced apart from each other in a first connecting plane, are of an essentially square cross section and have T-shaped connecting grooves cut into all outsides for a connection with electrical installation devices having flat connectors in a second connecting plane, which is arranged perpendicularly to the first connecting plane.

2. Description of Related Art

Bus bars and electrical installation devices of this type are preferably used for high current strength and are designed with appropriate large cross sections in current-carrying areas. If, for example, the bus bars are arranged in a horizontal connecting plane of a switchgear cabinet, and if the installation device to be connected which has flat connectors located in one plane is to be installed in the switchgear cabinet in a vertical connecting plane, it is necessary to use specially angled and/or bent off connecting contacts between the bus bars and the flat connectors, because the respective connecting points for the individual bus bars and the associated flat connectors are spatially arranged differently from each other. Thus the connecting contacts can only be made after the installation location of the installation device is set. However, this presents considerable difficulties at the place of employment of the switchgear cabinet, particularly if the connecting contacts are formed as flat rails for great current strengths.

SUMMARY OF THE INVENTION

It is one object of this invention to provide a bus bar system of the type mentioned above but wherein a connection between the bus bars and the flat connectors of an installation device is made with prefabricated parts, even if the bus bars are arranged in two connecting planes which extend perpendicularly with respect to each other.

In accordance with this invention, this object is achieved with insulating bows, or insulating chassis, which can be fastened on the side of the bus bars facing the installation device at the spacing of the flat connectors of the installation device, which extend perpendicular to a linear direction of the bus bars and can have a cutout in the area of each bus bar. A contact piece, which can be connected with the associated bus bar, can be inserted into each insulating chassis only in the area of an associated bus bar. The insulating chassis receives a connecting leg of connecting elbows, which can be or are connected together with the associated contact piece and with the associated bus bar. Together with a connecting leg projecting from the insulating chassis, the connecting contacts form connecting points for the flat connectors of the installation device in the second fastening plane, which extends perpendicularly with respect to the first fastening plane.

Connecting points to the individual bus bars can be established by the insulation chassis, the contact pieces and the connecting elbows, with a plane that is aligned with the connecting plane of the flat connectors of the installation device, for example, that extends parallel with the installation device. The insulation chassis, the contact pieces and the connecting bows can be prefabricated and provided as kits for defined maximum current strengths.

Fastening of the contact pieces and of the connecting elbows with the insulating bows to the bus bars is accomplished in accordance with one embodiment because the connecting grooves of the bus bar receive sliding nuts with threaded receivers, into which connecting screws can be screwed which can be or are inserted through fastening bores of the connecting elbows and the contact pieces.

In this embodiment, the lateral legs of the insulating chassis form a receiver for the connecting legs of the connecting elbows, which extends transversely to the linear direction of the bus bars.

So that uniform connecting elbows can be used, in a further embodiment the connecting legs of the connecting elbows have a row of fastening bores, at least one fastening bore of which is arranged in the area of the cutouts assigned to the bus bars. Therefore the spatial orientation of the insulating bows and the connecting elbows received in them in the first connecting plane of the bus bars remains the same, but it is assured that the connections with the associated bus bars can be individually made because appropriate cutouts in the insulating bows are occupied by contact pieces.

The connection of the installation device is simplified because the end areas of the junction legs of the connecting elbows have connecting bores, which are matched to the fastening bores in the flat connectors of the installation device.

In a further embodiment, the cutouts in the insulating bows can be provided as needed by partial areas which can be broken out and thus it is possible to create the cutout for the contact piece only at the desired location. Then access to bus bars, which are not to be connected, is prevented thus improving insulation toward the connecting elbow, which is not involved.

In a further adaptation option for the two connecting planes the junction legs of the connecting elbows can be extended by flat rails for increasing a distance between the contact places for the installation device perpendicularly with respect to the first connecting plane of the bus bars. The flat rails can be or are connected with the flat connectors of the installation device using Z-shaped transition pieces.

In one embodiment, the connecting elbows are assembled from several individual connecting elbows, having connecting legs that rest on top of each other and junction legs spaced apart from each other. A space between the junction legs is matched to the thickness of the flat connectors of the installation device. Unoccupied spaces are filled with spacing contact pieces. The flat rails and the transition pieces are put together from several spaced apart individual flat rails and individual transition pieces, wherein their spacing is matched to the thickness of the junction legs of the connecting bows and of the flat connectors of the installation device. These individual elements can be used for maximum current strengths of arbitrary size when one or several of these individual elements are combined to form a connecting elbow, a flat rail and a Z-shaped transition piece.

The individual elements can be maintained at a distance from each other using special spacing elements.

Contacts between the bus bar and the contact piece can be improved because the contact pieces are designed in a bow shape and form a receiver for the bus bar with their lateral legs.

BRIEF DESCRIPTION OF THE DRAWINGS

This invention is explained in greater detail in view of exemplary embodiments shown in the drawings, wherein:

FIG. 2 is an exploded perspective view of a portion of a bus bar having a sliding nut, which can be inserted into a connecting groove;

FIG. 3 is an exploded perspective view of a bus bar system corresponding to FIG. 1, wherein the vertical connecting plane for the flat connectors of the installation device can be displaced perpendicularly and parallel with respect to the horizontal connecting plane of the bus bar using flat rails and Z-shaped transition pieces.

DESCRIPTION OF PREFERRED EMBODIMENTS

Figure 1:
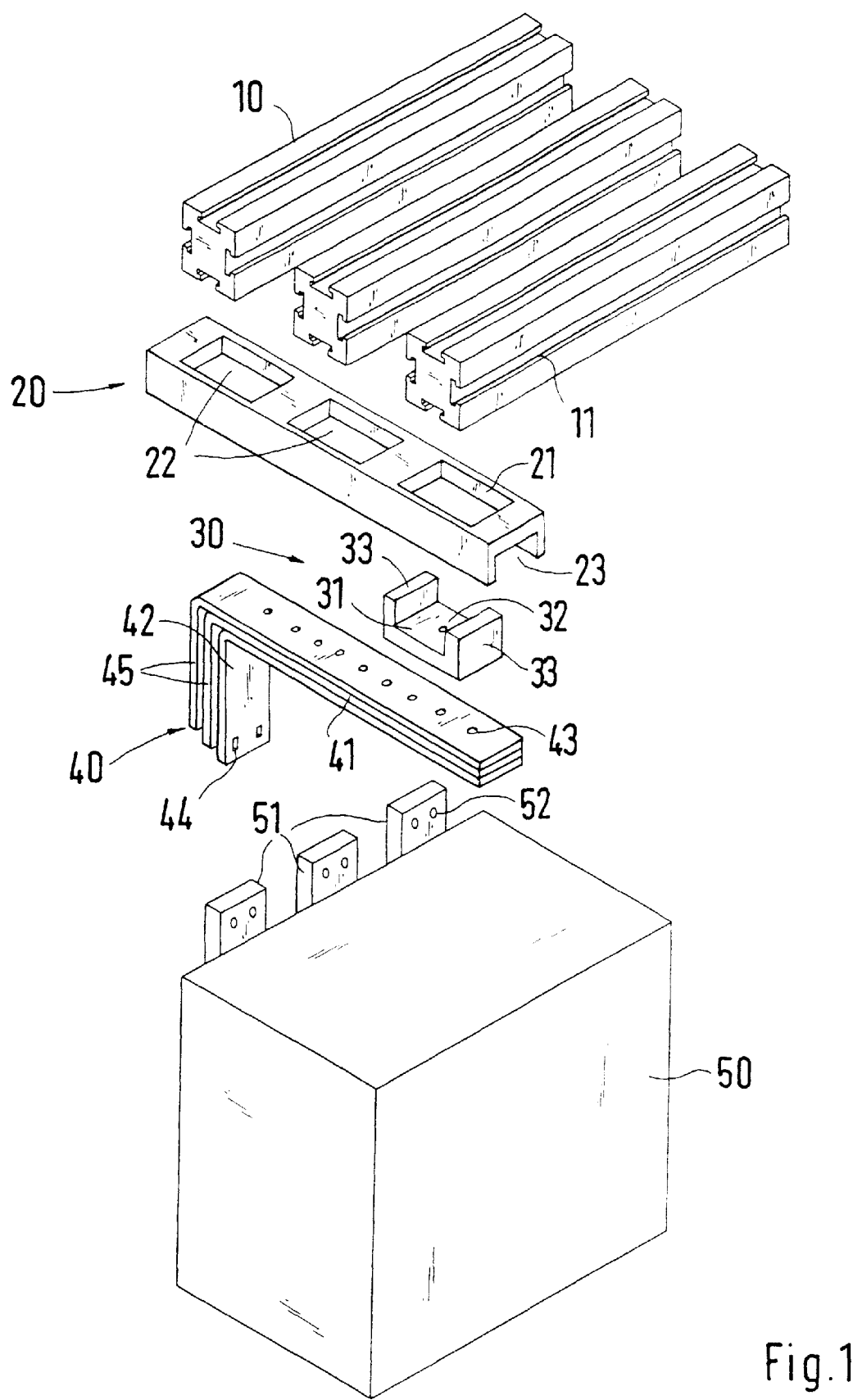
FIG. 1 is an exploded perspective view of a bus bar system with three bus bars in a horizontal connecting plane and an electrical installation device having flat connectors arranged in a vertical connecting plane.

As shown in FIG. 1, three bus bars 10 are arranged at a preset distance from each other in a horizontal connecting plane, wherein a holder, not shown, fixes the bus bars in a fastening plane in the switchgear cabinet. A square cross section and a distance between the bus bars 10 is determined by a maximum current strength. If connecting an electrical installation device 50 having flat connectors 51 with the bus bars 10, the connecting elements are relocated into the vertical connecting plane of the connectors 51 of the installation device 50 which, for example, can be a rotary current power switch. The connection of one phase is explained in view of FIG. 1.

One insulating bow or insulating chassis 20, which can be embodied as a plastic injection-molded part, for example, per phase is attached to an underside of the bus bars 10. The insulating chassis 20 extends transversely to the bus bars 10 and has partial areas 22, which can be broken out to form a cutout 21 in the area of each bus bar 10, as shown by the reference numerals 22 and 21. In this case, only one cutout 21 toward an associated bus bar 10 exists in each insulating chassis 20. The three insulating chassis 20 are arranged in the linear direction of the bus bars 10 at a distance from each other, which corresponds to the distance between the flat connectors 51 in the installation device 50, as shown in FIG. 3. A bow-like contact piece 30 is inserted into the cutout 21 of the insulating chassis 20, whose lateral legs 33 form a receiver for the associated bus bar 10. A fastening bore 32 is cut into the base leg 31 of the contact piece 30. Toward the installation device 50, the insulating chassis 20 forms a receptacle 23, which receives a connecting leg 41 of a connecting elbow 40. This connecting elbow 40, the same as the insulating chassis 20, extends over all bus bars 10. The connecting leg 41 has a row of fastening bores 43, of which at least respectively one meets the parts of the insulating chassis 20 indicated by element reference numerals 21 and 22, so that each connecting elbow 40 can be selectively connected with each one of the bus bars 10. The connecting elbows 40 for all phases are therefore identically designed and with junction legs 42 project out of the insulating chassis 20. In this case, and as shown in FIG. 3, the junction legs 42 are aligned in a vertical connecting plane, so that the flat connectors 51 of the installation device 50 can be directly connected with them. The connection takes place via the connecting bores 44 of the connecting legs 42, which are matched to the fastening bores 52 of the flat connector 51 of the installation device.

T-shaped sliding nuts 25 with threaded receivers 26, into which connecting screws can be screwed, are pushed into the connecting groove 11 of the bus bars 10. The connecting screws are inserted through fastening bores 43 of the connecting leg 41 of the connecting elbow 40 and the fastening bore 32 in the contact piece 30, so that the connecting screws connect the connecting elbow 40 with the insulating chassis 20 and the inserted contact piece 30 with the associated bus bar 10.

A connecting pattern with all three bus bars 10 is thus created. The connecting elbows 40 can be solidly bent out from flat material or assembled from several individual connecting elbows. The connecting legs 41 lie flush on top of each other, while the junction legs 42 can be spaced apart from each other by a space 45, as shown in FIGS. 1 and 3.

The connecting plane for the flat connectors 51 of the installation device 50 can be displaced perpendicularly and parallel with the connecting plane of the bus bars 10, as shown in FIG. 3. Either solid flat rails 60, or those put together from individual elements can be used, which occupy the spaces 45 between the connecting elbows 40 and define the parallel offset of the connecting plane. The perpendicular offset is defined by Z-shaped transition pieces 70. It is possible to use solid transition pieces 70, or those put together from individual elements, which form interlocking connections. Unoccupied spaces between the individual elements in the area of the connection places, for example screw connections, can be filled using filler contact pieces.

As shown in FIG. 3, the individual flat rails of the spacer elements 90 can be spaced apart and additionally fastened in the switchgear cabinet by a support rail 80 or the like. The same applies to the Z-shaped transition pieces 70. If the connecting elbows 40, the flat rails 60 and the transition pieces 70 are assembled from individual elements, it is possible with the number of the individual elements to change or adapt the maximum current strength transmitted via the connections.

Figure 4:
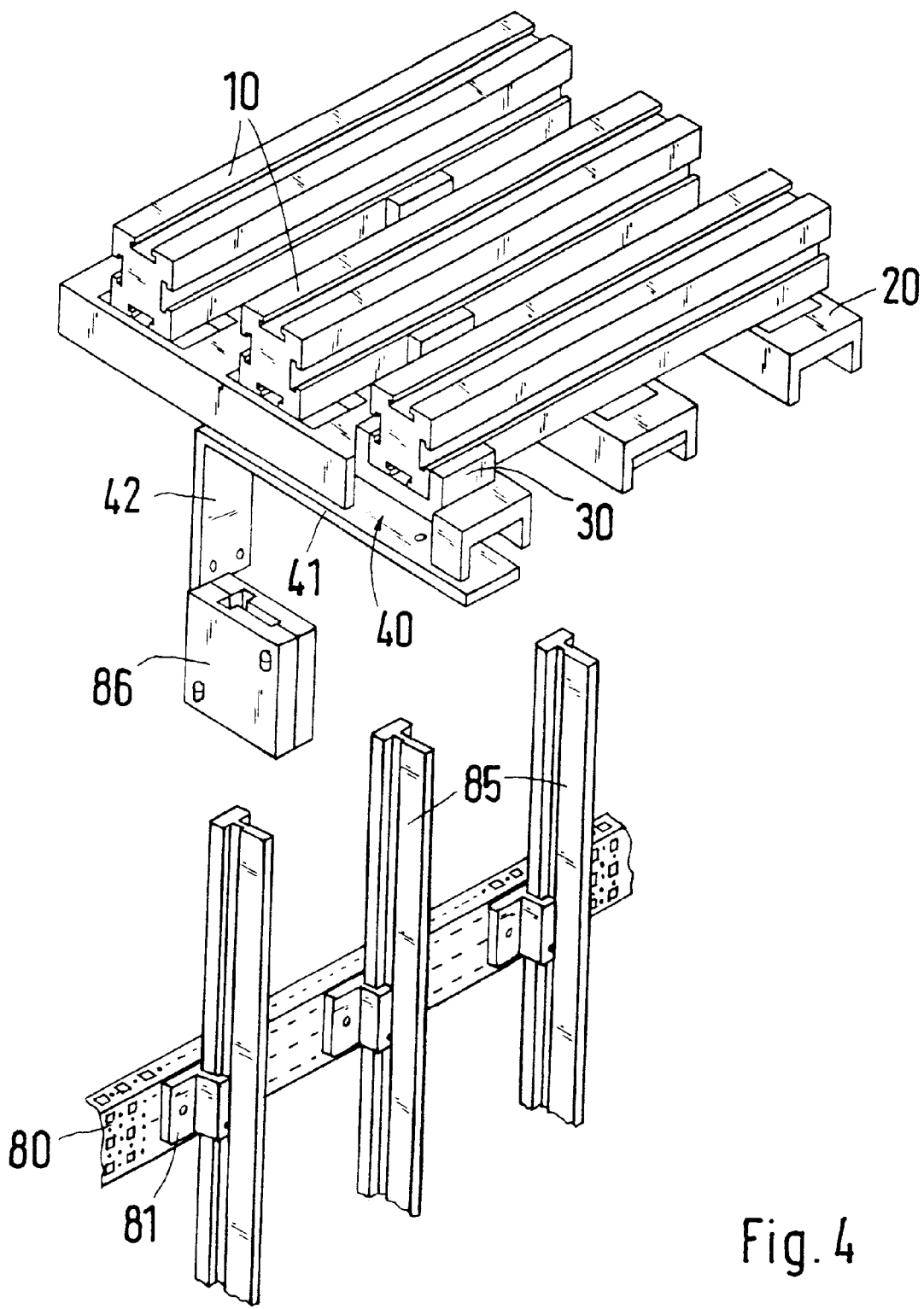
FIG. 4 is an exploded perspective view of a bus bar system wherein differently designed connecting rails, on which the installation devices can be pushed by means of spring contacts, can be attached to the connecting elbows.

As shown in FIG. 4, the connections can also be adapted to differently designed connectors of the installation device. If the installation device has pluggable, U-shaped plug contacts as the connectors, it is possible to use T-shaped connecting rails 85, which can be conductively connected via adapters 86 with the junction legs 42 of the connecting elbows 40. The connecting rails 85 can be fastened on a support rail 80 by means of holding elements 81.

What is claimed is:

1. In a bus bar system having bus bars spaced apart from each other in a first connecting plane, of an essentially square cross section and having T-shaped connecting grooves within outsides for a connection with an electrical installation device having flat connectors in a second connecting plane, the improvement comprising:

an insulating chassis (20) fastenable to a plurality of sides of the bus bars (10) facing the installation device (50) at a spacing of the flat connectors (51) of the installation device (50) which are perpendicular to a linear direction of the bus bars (10) and can have a cutout (21) in an area of each of the bus bars (10);

a contact piece (30) connectible with a corresponding one of the bus bars (10) insertable into the insulating chassis (20) only near an associated one of the bus bars (10);

the insulating chassis (20) receiving a connecting leg (41) of a connecting elbow (40) which is connectible with the contact piece (30) with the associated bus bar (10); and a connecting leg (42) projecting from the insulating chassis (20) and the connecting contacts (40) forming connecting points for the flat connectors (51) of the installation device (50) in the second fastening plane which is perpendicular to the first fastening plane.

2. In the bus bar system in accordance with claim 1, wherein the connecting grooves (11) of the bus bars (10) receive a plurality of sliding nuts (25) with threaded receivers (26) into which connecting screws are inserted through fastening bores (43,32) of the connecting elbows (40) and the contact pieces (30).

3. In the bus bar system in accordance with claim 2, wherein the lateral legs of the insulating chassis (20) facing the installation device (50) form a receptacle (23) for the connecting leg (41) of one of the connecting elbows (40).

4. In the bus bar system in accordance with claim 3, wherein the connecting leg (41) of the connecting elbows (40) has a row of fastening bores (43) and at least one of the fastening bores (43) which is arranged near the cutouts (21) is assigned to the bus bars (10).

5. In the bus bar system in accordance with claim 4, wherein end areas of the connecting leg (42) of the connecting elbows (40) has connecting bores (44) matched to the fastening bores (52) in the flat connectors (51) of the installation device (50).

6. In the bus bar system in accordance with claim 5, wherein the cutouts (21) in the insulating chassis (20) have partial areas (22) which can be broken out.

7. In the bus bar system in accordance with claim 6, wherein the junction legs (42) of the connecting elbows (40) are extendible by flat rails (60) for increasing a distance between contact places for the installation device (50) perpendicular with respect to the first connecting plane of the bus bars (10).

8. In the bus bar system in accordance with claim 7, wherein the flat rails (60) are connectible with the flat connectors (51) of the installation device (50) using Z-shaped transition pieces (70).

9. In the bus bar system in accordance with claim 8, wherein the connecting contacts (40) are assembled from individual connecting elbows with connecting legs (41) that rest on top of each other and that have junction legs (42) spaced apart from each other, wherein a space (45) between the junction legs (42) is matched to a thickness of the flat connectors (51) of the installation device (50), and unoccupied spaces (45) are filled with spacing contact pieces.

10. In the bus bar system in accordance with claim 8, wherein the flat rails (60) and the transition pieces (70) are assembled from several spaced apart individual flat rails and individual transition pieces, wherein a spacing is matched to a thickness of the junction legs (42) of the connecting bows (40) and of the flat connectors (51) of the installation device (50).

11. In the bus bar system in accordance with claim 10, wherein the individual rails and the individual transition pieces are maintained at a distance from each other by a plurality of spacing elements (90).

12. In the bus bar system in accordance with claim 11, wherein the contact pieces (30) are designed in a bow-shape and form a receiver for the bus bars (10) with lateral legs (33).

13. In the bus bar system in accordance with claim 1, wherein lateral legs of the insulating chassis (20) facing the installation device (50) form a receptacle (23) for the connecting leg (41) of one of the connecting elbows (40).

14. In the bus bar system in accordance with claim 1, wherein the connecting leg (41) of the connecting elbows (40) has a row of fastening bores (43) and at least one of the fastening bores (43) which is arranged near the cutouts (21) is assigned to the bus bars (10).

15. In the bus bar system in accordance with claim 1, wherein end areas of the connecting leg (42) of the connecting elbows (40) has connecting bores (44) matched to the fastening bores (52) in the flat connectors (51) of the installation device (50).

16. In the bus bar system in accordance with claim 1, wherein the cutouts (21) in the insulating chassis (20) have partial areas (22) which can be broken out.

17. In the bus bar system in accordance with claim 1, wherein the junction legs (42) of the connecting elbows (40) are extendible by flat rails (60) for increasing a distance between contact places for the installation device (50) perpendicular with respect to the first connecting plane of the bus bars (10).

18. In the bus bar system in accordance with claim 1, wherein the connecting contacts (40) are assembled from individual connecting elbows with connecting legs (41) that rest on top of each other and that have junction legs (42) spaced apart from each other, wherein a space (45) between the junction legs (42) is matched to a thickness of the flat connectors (51) of the installation device (50), and unoccupied spaces (45) are filled with spacing contact pieces.

19. In the bus bar system in accordance with claim 7, wherein the flat rails (60) and transition pieces (70) are assembled from several spaced apart individual flat rails and individual transition pieces, wherein a spacing is matched to a thickness of the junction legs (42) of the connecting bows (40) and of the flat connectors (51) of the installation device (50).

20. In the bus bar system in accordance with claim 7, wherein the individual rails and individual transition pieces are maintained at a distance from each other by a plurality of spacing elements (90).

21. In the bus bar system in accordance with claim 1, wherein the contact pieces (30) are designed in a bow-shape and form a receiver for the bus bars (10) with lateral legs (33).

* * * * *